United States Patent
Teramoto (10) Patent No.: US 10,884,181 B2
(45) Date of Patent: Jan. 5, 2021

(54) BACKLIGHT AND DISPLAY APPARATUS

(71) Applicant: Mitsubishi Electric Corporation, Tokyo (JP)

(72) Inventor: Hiroshi Teramoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/728,228

(22) Filed: Dec. 27, 2019

(65) Prior Publication Data
US 2020/0233147 A1 Jul. 23, 2020

(30) Foreign Application Priority Data
Jan. 23, 2019 (JP) .................. 2019-009191

(51) Int. Cl.
*G02F 1/13* (2006.01)
*F21V 8/00* (2006.01)

(52) U.S. Cl.
CPC ......... *G02B 6/0088* (2013.01); *G02B 6/0021* (2013.01)

(58) Field of Classification Search
CPC .. G02B 6/0088; G02B 6/0091; G02B 6/0093; G02F 2201/503; G02F 1/133615
See application file for complete search history.

(56) References Cited

U.S. PATENT DOCUMENTS

| 9,163,810 | B2 * | 10/2015 | Katoh | ................ | F21V 19/002 |
| 2003/0164913 | A1 * | 9/2003 | Ogawa | ............... | G02B 6/0088 349/113 |
| 2008/0297687 | A1 * | 12/2008 | Watanabe | ............ | G02B 6/0021 349/58 |
| 2011/0069509 | A1 * | 3/2011 | Lin | ...................... | G02B 6/0088 362/607 |
| 2012/0170311 | A1 * | 7/2012 | Huang | ................. | G02B 6/0088 362/611 |
| 2013/0010499 | A1 * | 1/2013 | Que | ..................... | G02B 6/0085 362/631 |
| 2017/0108638 | A1 * | 4/2017 | Teragawa | ............ | G02B 6/0088 |

FOREIGN PATENT DOCUMENTS

| JP | 2004-184493 A | 7/2004 |
| JP | 2008-091275 A | 4/2008 |

\* cited by examiner

*Primary Examiner* — Andrew J Coughlin
(74) *Attorney, Agent, or Firm* — Studebaker & Brackett PC (57) ABSTRACT

The rear frame includes a frame-like body and a protrusion. The protrusion projects from an inner surface of the frame-like body. A light source unit is disposed on the inner surface, and includes a point light source. The light incident surface on a side surface of the light guide plate faces a light-emitting surface with a gap. An abutting side surface of the light guide plate projects toward the inner surface. The protrusion is fitted to a recess on the abutting side surface. The joining medium joins the abutting side surface with the light source unit. Alternatively, a projecting portion of the light guide plate projects in a direction different from a direction in which the abutting side surface projects. The intermediate frame sandwiches the light guide plate together with the rear frame and includes a sandwiching portion. The sandwiching portion sandwiches the projecting portion.

14 Claims, 7 Drawing Sheets

BACKLIGHT AND DISPLAY APPARATUS

BACKGROUND OF THE INVENTION

Field of the Invention

The present invention relates to a backlight and a display apparatus including the backlight.

Description of the Background Art

A liquid crystal display apparatus (LCD) has advantages, such as light weight and thinness. For this reason, in recent years, a liquid crystal display apparatus has been widely used.

The liquid crystal display apparatus includes a backlight and a liquid crystal display panel.

The backlight faces a back surface of the liquid crystal display panel. The backlight is a planar light source apparatus having a wide light-emitting surface, and includes a light source unit and a light guide plate. The light source unit includes a light-emitting element.

The backlight illuminates the liquid crystal display panel. When the backlight illuminates the liquid crystal display panel, the light-emitting element emits light. The emitted light is incident on a side surface of the light guide plate. The light guide plate guides incident light and emits the guided light from a main surface of the light guide plate. The emitted light is incident on a back surface of the liquid crystal display panel. The liquid crystal display panel modulates incident light and emits the modulated light from a front surface of the liquid crystal display panel.

The liquid crystal display panel includes an array substrate, a counter substrate, a liquid crystal layer, a first polarizing plate, and a second polarizing plate. The array substrate and the counter substrate are disposed in parallel to each other and sandwich the liquid crystal layer. The first polarizing plate is attached to an outer main surface of the array substrate. The second polarizing plate is attached to an outer main surface of the counter substrate. The array substrate includes wiring, an electrode, and a glass substrate. The wiring and the electrode are formed on the glass substrate.

The liquid crystal display apparatus displays an image. When the liquid crystal display apparatus displays an image, the backlight illuminates the liquid crystal display panel. Further, an image signal is input to the liquid crystal display panel. In the liquid crystal display panel, a drive signal applied to each pixel of a large number of pixels constituting a display area of the liquid crystal display panel is controlled in accordance with the image signal input to the liquid crystal display panel, and a light transmittance of each pixel is controlled according to the drive signal applied to each pixel. In this manner, distribution of light transmittances corresponding to the input image signal is given to the display area of the liquid crystal display panel, and light incident on the liquid crystal display panel is modulated according to the input image signal. As a result, an image corresponding to the input image signal is displayed on the front surface of the liquid crystal display panel. The displayed image is viewed by an observer from the side of the front surface of the liquid crystal display panel.

The liquid crystal display apparatus is a light-receiving display apparatus. For this reason, the liquid crystal display apparatus is used in various applications that utilize the characteristics of the light-receiving display apparatus. For example, the liquid crystal display apparatus is used as a display of a personal computer, industrial equipment, or in-vehicle equipment. A liquid crystal display apparatus used as a display for portable industrial equipment or in-vehicle equipment is required to have a medium size, have low power consumption, have high brightness, and be able to stably display an image even under a strong vibration condition.

The light-emitting element is, in many cases, a light-emitting diode (LED). Then, in a case where the light-emitting element is an LED, when the liquid crystal display apparatus is required to have low power consumption and high brightness, an LED having high luminous efficiency needs to be employed and the number of LEDs needs to be increased, so that voltage applied to the LED is lowered and current flowing through the LED is reduced. For this reason, the cost of components is increased.

The LED includes, in many cases, a container, a semiconductor light-emitting element, and a filling. The container has a box-like shape without an upper lid. The semiconductor light-emitting element is attached to an inner surface of the container. The filling fills the periphery of the semiconductor light-emitting element. LEDs provided on the market are roughly classified into two types: a side-view LED and a top-view LED. The side-view LED is thin, emits light from a side surface of a rectangular parallelepiped, and is widely employed in a liquid crystal display apparatus for a mobile phone terminal. The top-view LED emits light from a top surface of a rectangular parallelepiped, has high brightness, and is widely employed in lighting equipment. In the liquid crystal display apparatus, both the side-view LED and the top-view LED are employed. However, the top-view LED is widely employed in the liquid crystal display apparatus having a medium size and high brightness.

In the technique described in Japanese Patent Application Laid-Open No. 2004-184493, a light source is mounted on a circuit board (paragraph 0041 and FIG. 12). As a type of the light source, it is preferable to use a light-emitting diode (paragraph 0033). The circuit board has a first positioning hole (paragraph 0041 and FIG. 12). The light guide plate has a second positioning hole (paragraph 0041 and FIG. 12). A frame includes a protrusion (paragraph 0041 and FIG. 12). The protrusion is engaged with the first and second positioning holes and is movable relatively to the first and second positioning holes or either one of the first and second positioning holes in a state of being inserted into the first and second positioning holes (paragraph 0041 and FIG. 12).

In the technique described in Japanese Patent Application Laid-Open No. 2008-91275, an LED substrate is obtained by mounting an LED on a flexible substrate (paragraph 0018 and FIG. 2). The LED substrate is integrated with a reinforcing member (paragraph 0018 and FIG. 2). In the reinforcing member, two protrusions are provided (paragraph 0025 and FIG. 2). A housing is provided with a notch (paragraph 0025). The notch and the protrusion are fitted (paragraph 0025 and FIG. 2).

In the backlight provided in the conventional liquid crystal display apparatus, a relative position of the light source unit with respect to the light guide plate is not maintained at a fixed position. For example, in the technique described in Japanese Patent Application Laid-Open No. 2004-184493, a unit including the light source and the circuit board moves in a direction perpendicular to a side surface of a light guide plate, and a relative position of the unit with respect to the light guide plate is not maintained at a fixed position. Further, in the technique described in Japanese Patent Application Laid-Open No. 2008-91275, the LED substrate moves in a direction perpendicular to a side surface of a light guide plate, and a relative position of the LED substrate with respect to the light guide plate is not maintained at a fixed position.

Further, in the backlight provided in the conventional liquid crystal display apparatus, there may be a case where light emitted by the light source unit is scattered by a structure for positioning, and brightness is lowered in the vicinity of the structure. For example, in the technique described in Japanese Patent Application Laid-Open No. 2004-184493, light emitted by the unit including the light source and the circuit board is scattered at the protrusion, the first hole, and the second hole, and brightness is lowered in the vicinity of the protrusion, the first hole, and the second hole. Further, in the technique described in Japanese Patent Application Laid-Open No. 2008-91275, light emitted from the LED substrate is scattered at the protrusion and the notch, and the brightness is lowered in the vicinity of the protrusion and the notch.

Due to the above, in the backlight included in the conventional liquid crystal display apparatus, the uniformity of in-plane brightness of the backlight has been lowered, and the brightness of the backlight has varied among individual backlights.

SUMMARY

An object of the present invention is to improve the uniformity of the in-plane brightness of the backlight and suppress variations in the brightness of the backlight among individual backlights.

The present invention is directed to a backlight.

The backlight includes a rear frame, a light source unit, and a light guide plate.

The rear frame includes a frame-like body and a protrusion. The frame-like body has an inner surface. The protrusion projects from the inner surface.

The light source unit is housed in the rear frame, is disposed on the inner surface, and includes a point light source having a light-emitting surface.

The light guide plate is housed in the rear frame and has a side surface. The side surface has a light incident surface and an abutting side surface. The light incident surface faces a light-emitting surface with a gap between them. The abutting side surface projects toward the inner surface more than the light incident surface. The light guide plate has a recess on the abutting side surface. The protrusion is fitted to the recess.

The backlight further includes a joining medium. The joining medium joins the abutting side surface with the light source unit. Alternatively, the backlight includes an intermediate frame, and the light guide plate includes a projecting portion. The projecting portion projects in a direction different from the direction in which the abutting side surface projects. The intermediate frame sandwiches the light guide plate together with the rear frame and includes a sandwiching portion. The sandwiching portion sandwiches the projecting portion from a direction perpendicular to the inner surface.

The present invention is also directed to a display apparatus including the backlight.

The protrusion of the rear frame is fitted to the recess of the light guide plate. For this reason, the light guide plate is inhibited from moving in a direction parallel to the inner surface of the rear frame. Further, the abutting side surface of the light guide plate is fixed to the light source unit disposed on an inner peripheral surface of the rear frame by the joining medium. Alternatively, the projecting portion of the light guide plate is sandwiched from the direction perpendicular to the inner surface of the rear frame by the sandwiching portion of the intermediate frame. For this reason, the light guide plate is inhibited from moving in a direction perpendicular to the inner surface of the rear frame. By the above, the relative position of the light source unit with respect to the light guide plate is maintained at a fixed position.

Further, the abutting side surface having the recess to which the protrusion of the rear frame is fitted projects toward the inner surface of the rear frame on which the light source unit is disposed more than the light incident surface of the light guide plate facing the light-emitting surface of the point light source. For this reason, light traveling from the light-emitting surface of the point light source toward the recess of the light guide plate and the protrusion of the rear frame is reduced, and scattering of the light emitted by the light source unit at the recess of the light guide plate and the protrusion of the rear frame is suppressed.

Therefore, the uniformity of the in-plane brightness of the backlight can be improved and variations in the brightness of the backlight among individual backlights can be suppressed.

These and other objects, features, aspects and advantages of the present invention will become more apparent from the following detailed description of the present invention when taken in conjunction with the accompanying drawings.

DESCRIPTION OF THE PREFERRED EMBODIMENTS

1 First Preferred Embodiment

1.1 Outline of Liquid Crystal Display Apparatus

Figure 1:
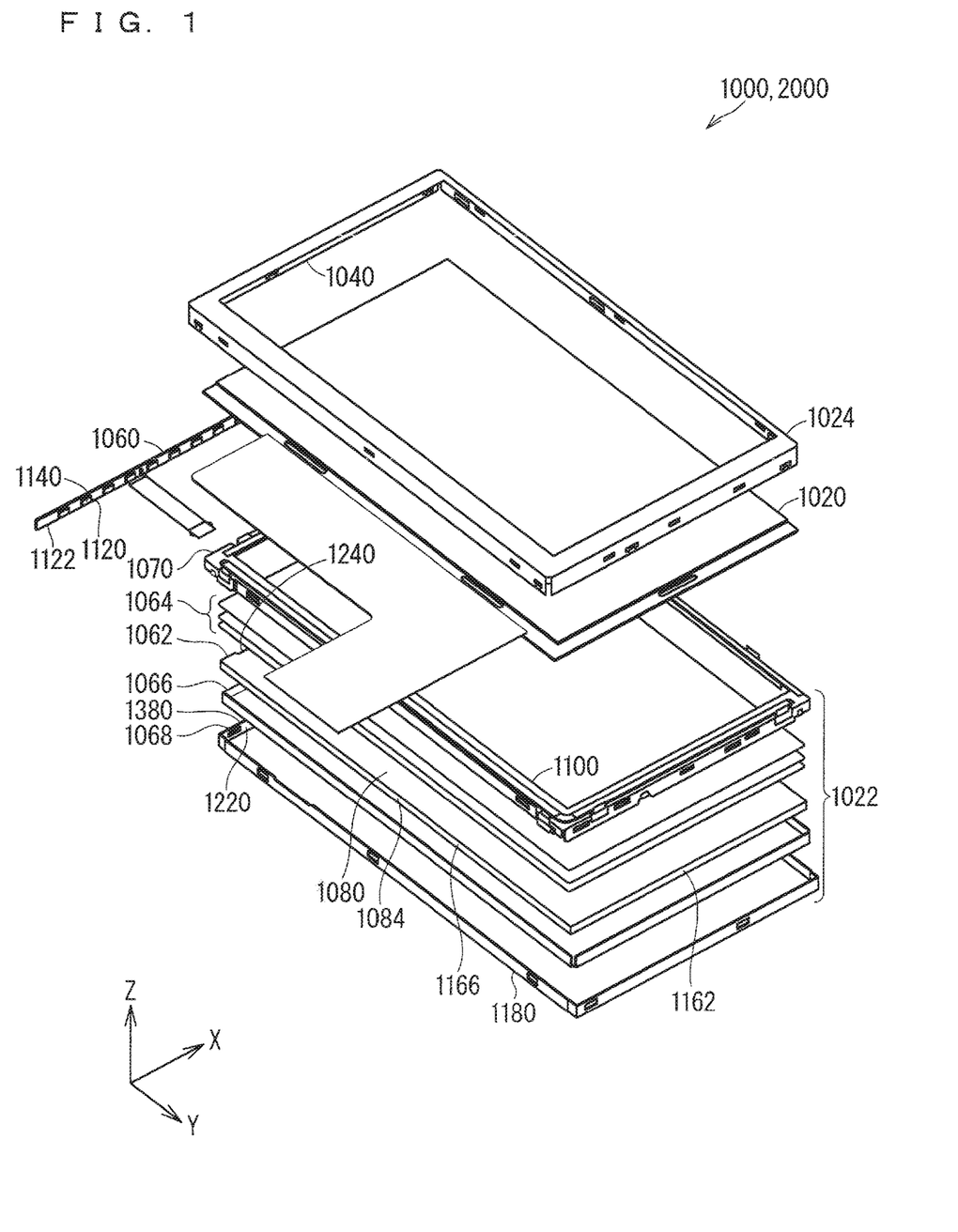
FIG. 1 is an exploded perspective view schematically illustrating a liquid crystal display apparatus according to first and second preferred embodiments.

FIG. 1 is an exploded perspective view schematically illustrating a liquid crystal display apparatus according to a first preferred embodiment.

A liquid crystal display apparatus 1000 of the first preferred embodiment illustrated in FIG. 1 displays an image by using a birefringence characteristic of a liquid crystal. The liquid crystal display apparatus 1000 includes a liquid crystal display panel 1020, a backlight 1022, and a front frame 1024. The liquid crystal display apparatus 1000 may include elements other than these elements. A display apparatus including a display panel other than the liquid crystal display panel 1020 may include the backlight 1022. A display panel other than the liquid crystal display panel 1020 is a transparent plate or the like on which characters, pictures, and the like are printed.

The liquid crystal display panel 1020 is disposed on the backlight 1022 and is sandwiched between the backlight 1022 and the front frame 1024. The backlight 1022 faces a back surface of the liquid crystal display panel 1020.

When the liquid crystal display apparatus 1000 displays an image, the backlight 1022 illuminates the liquid crystal display panel 1020. Further, an image signal is input to the liquid crystal display panel 1020. In the liquid crystal display panel 1020, a drive signal applied to each pixel of a large number of pixels constituting a display area of the liquid crystal display panel 1020 is controlled in accordance with the image signal input to the liquid crystal display panel 1020, and a light transmittance of each pixel is controlled according to the drive signal applied to each pixel. In this manner, distribution of light transmittances corresponding to the input image signal is given to the display area of the liquid crystal display panel 1020, and light incident on the liquid crystal display panel 1020 is modulated according to the input image signal. As a result, an image corresponding to the input image signal is displayed on a front surface of the liquid crystal display panel 1020. The displayed image is viewed through an opening 1040 of the front frame 1024 from the side of the front surface of the liquid crystal display apparatus 1000.

1.2 Outline of Liquid Crystal Display Panel

The liquid crystal display panel 1020 includes an array substrate, a counter substrate, a liquid crystal layer, a first polarizing plate, a second polarizing plate, a spacer, and a sealing material. The array substrate acid the counter substrate are disposed in parallel to each other and sandwich the liquid crystal layer. The spacer maintains a gap between the array substrate and the counter substrate. The sealing material attaches the array substrate and the counter substrate to each other to seal the liquid crystal layer. The first polarizing plate is attached to an outer main surface of the array substrate. The second polarizing plate is attached to an outer main surface of the counter substrate.

The array substrate is a TFT substrate including wiring, a pixel electrode, a thin-film transistor (TFT), an alignment film, a glass substrate, and the like. The wiring, the pixel electrode, the TFT, the alignment film, and the like are formed on the glass substrate. The array substrate may include a switching element other than the TFT. The counter substrate is a color filter substrate including a color filter, a light shielding layer, a counter electrode, an alignment film, a glass substrate, and the like. The color filter, the light shielding layer, the counter electrode, the alignment film, and the like are formed on the glass substrate. The alignment film aligns a liquid crystal molecule contained in the liquid crystal layer. The TFT carries out or stops application of a drive voltage to each pixel. In this manner, the orientation of the liquid crystal molecule belonging to each pixel is controlled, and the light transmittance of each pixel is controlled.

1.3 Outline of Backlight

Figure 2:
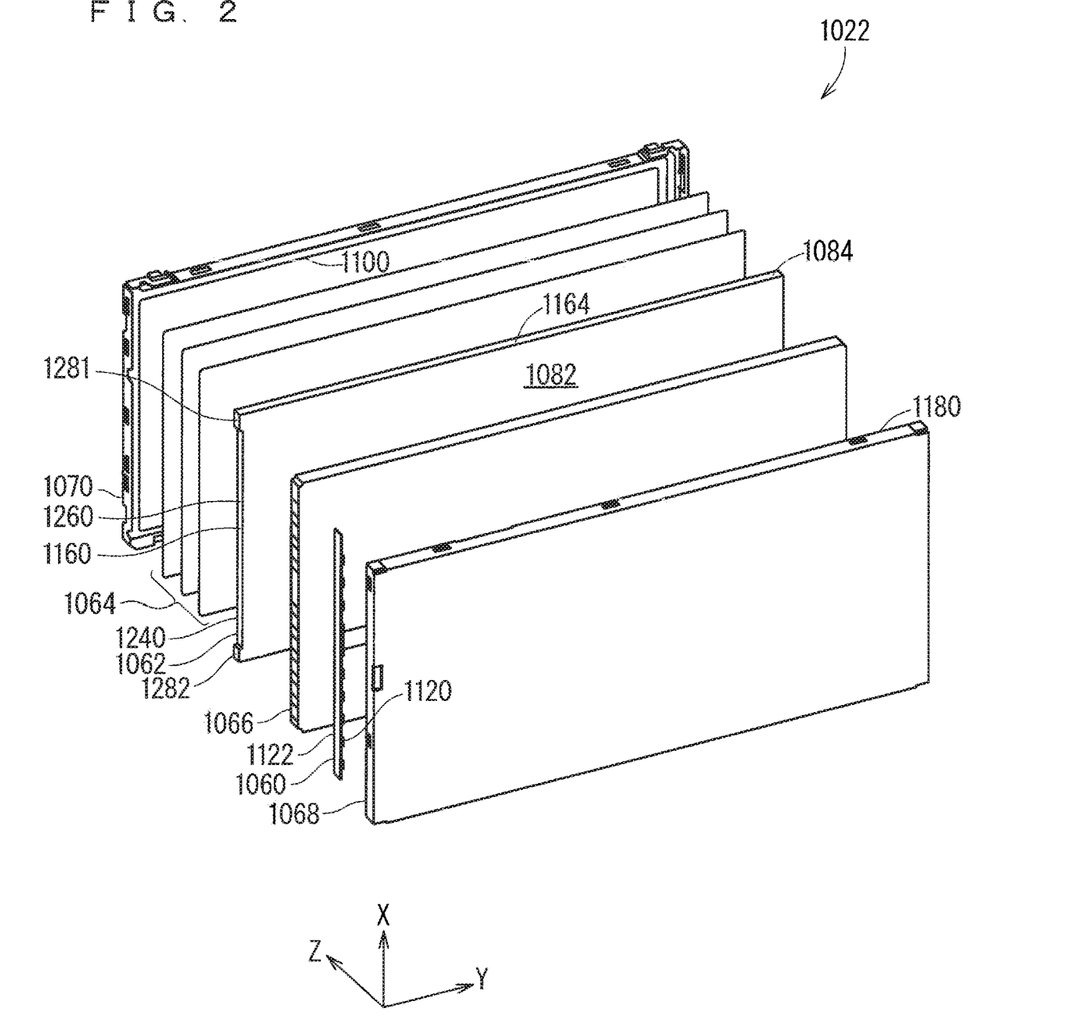
FIG. 2 is an exploded perspective view schematically illustrating a backlight included in the liquid crystal display apparatus according to the first and second preferred embodiments.

FIG. 2 is an exploded perspective view schematically illustrating the backlight included in the liquid crystal display apparatus according to the first preferred embodiment.

As illustrated in FIGS. 1 and 2, the backlight 1022 includes a light source unit 1060, a light guide plate 1062, an optical sheet 1064, a reflection sheet 1066, a rear frame 1068, and an intermediate frame 1070. The backlight 1022 may include an element other than these elements.

The intermediate frame 1070 faces the rear frame 1068, is put on the rear frame 1068 from the side of the front surface of the liquid crystal display apparatus 1000, and is engaged with the rear frame 1068. The light source unit 1060, the light guide plate 1062, the optical sheet 1064, and the reflection sheet 1066 are housed in the rear frame 1068 and supported by the rear frame 1068. The light source unit 1060 is attached to the rear frame 1068 and supported by the rear frame 1068. The light guide plate 1062, the optical sheet 1064, and the reflection sheet 1066 are placed on top of each other and sandwiched between the rear frame 1068 and the intermediate frame 1070.

The light guide plate 1062 has an emission surface 1080, a non-emission surface 1082, and a side surface 1084. The emission surface 1080 is one main surface of the light guide plate 1062. The non-emission surface 1082 is the other main surface of the light guide plate 1062. The side surface 1084 connects the emission surface 1080 and the non-emission surface 1082, and is substantially perpendicular to the emission surface 1080 and the non-emission surface 1082. The light source unit 1060 faces the side surface 1084. The optical sheet 1064 is disposed on the emission surface 1080. The reflection sheet 1066 is disposed on the non-emission surface 1082.

The light source unit 1060 emits light. The emitted light is incident on the side surface 1084 of the light guide plate 1062. The light guide plate 1062 emits the incident light from the emission surface 1080 and the non-emission surface 1082. The light guide plate 1062 mainly emits light from the emission surface 1080. The light emitted from the emission surface 1080 is emitted in an emission direction toward an opening 1100 of the intermediate frame 1070 and sequentially passes through the optical sheet 1064 and the liquid crystal display panel 1020. The light emitted from the non-emission surface 1082 is reflected by the reflection sheet 1066 and sequentially passes through the light guide plate 1062, the optical sheet 1064, and the liquid crystal display panel 1020. The reflection sheet 1066 contributes to improving the utilization efficiency of the light emitted by the light source unit 1060.

1.4 Light Source Unit

The light source unit 1060 includes a point light source 1120 and a circuit board 1122, as illustrated in FIGS. 1 and 2.

The point light source 1120 is mounted on the circuit board 1122. The point light source 1120 converts electric power supplied via the circuit board 1122 into light, and emits the light.

The point light source 1120 has a light-emitting surface 1140 and emits light from the light-emitting surface 1140. The light-emitting surface 1140 is a flat surface.

Figure 3:
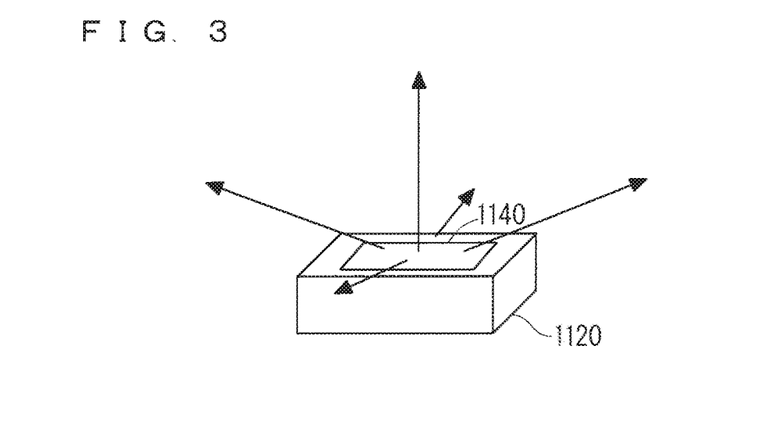
FIG. 3 is a perspective view schematically illustrating a point light source included in the liquid crystal display apparatus according to the first and second preferred embodiments.
Figure 4:
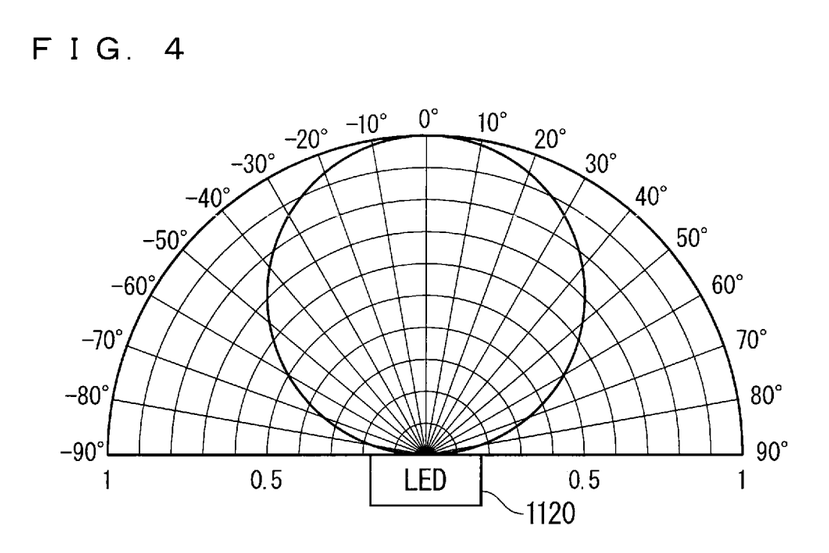
FIG. 4 is a diagram showing light emission intensity distribution in a vertical plane of the point light source provided in the liquid crystal display apparatus of the first and second preferred embodiments.

FIG. 3 is a perspective vie schematically illustrating the point light source included in the liquid crystal display apparatus according to the first preferred embodiment. FIG. 4 is a diagram showing light emission intensity distribution in a vertical plane of the point light source provided in the liquid crystal display apparatus of the first preferred embodiment.

The point light source 1120 is a top-view point light source as illustrated in FIG. 3. For this reason, the point light source 1120 has a rectangular parallelepiped shape, includes an electrode on a bottom surface, and includes the light-emitting surface 1140 on a top surface on the side opposite to the side where the bottom surface is located. The bottom surface of the point light source 1120 is mounted on the circuit board 1122.

Further, the point light source 1120 exhibits light emission intensity distribution represented by a spherical distribution curve, as illustrated in FIG. 4. For this reason, emission intensity of the point light source 1120 is uniform in an XY plane in a case of being observed from a Y-axis direction perpendicular to the light-emitting surface 1140 of the point light source 1120. However, in a case where an angle formed by the Y-axis direction and the observation direction changes, the emission intensity of the point light source 1120 changes according to the angle.

The point light source 1120 is a light-emitting diode (LED). The point light sources 1120 include LEDs of red (R), green (G), and blue (B) which are the three primary colors of light. The point light sources 1120 may include an LED of an emission color other than R, G, and B.

The circuit board 1122 may be a rigid board or a flexible board. The rigid substrate is a glass epoxy substrate whose main component is glass epoxy resin, a metal substrate whose main component is metal, such as aluminum, a ceramic substrate whose main component is ceramic, or the like. A metal substrate and a ceramic substrate have high thermal conductivity. For this reason, in a case where it is desired to improve heat dissipation, the circuit board 1122 is desirably a metal substrate or a ceramic substrate. The flexible substrate is a flexible printed circuit board (FPC) or the like.

1.5 Light Guide Plate

As illustrated in FIGS. 1 and 2, the liquid crystal display apparatus 1000 has a rectangular planar shape when viewed in plan from a thickness direction of the liquid crystal display apparatus 1000. For this reason, the light guide plate 1062 also has a rectangular planar shape when viewed in plan from a thickness direction of the light guide plate 1062. Further, the light guide plate 1062 has a uniform thickness. For this reason, the light guide plate 1062 has a flat-plate like three-dimensional shape.

For this reason, the side surface 1084 of the light guide plate 1062 has side surfaces 1160, 1162, 1164 and 1166. The side surfaces 1160 and 1162 are a pair of side surfaces on opposite sides. The side surfaces 1164 and 1166 are a pair of side surfaces on opposite sides. The side surfaces 1162, 1164 and 1166 have a flat surface.

The light source unit 1060 faces the side surface 1160 of the light guide plate 1062. For this reason, the light guide plate 1062 guides light incident on the side surface 1160 and emits the guided light mainly from the emission surface 1080. The emitted light has a planar spread in a direction perpendicular to a propagation direction.

The liquid crystal display apparatus 1000 may be a liquid crystal display apparatus of a different shape that does not have a rectangular planar shape. For example, the liquid crystal display apparatus 1000 may be a liquid crystal display apparatus of a different shape having a planar shape, such as a polygonal shape or a circular shape. For this reason, the light guide plate 1062 may also be a light guide plate of a different shape that does not have a rectangular planar shape. In a case where the light guide plate 1062 is a light guide plate of a different shape, there is a case where the light source unit 1060 faces the side surface 1160 of the light guide plate 1062 that is a flat surface constituting one side formed of a straight line when viewed in plan from the thickness direction of the light guide plate 1062, and there is also a case where the light source unit 1060 faces the side surface 1160 of the light guide plate 1062 that is a curved surface constituting a curved line when viewed in plan from the thickness direction of the light guide plate 1062.

The liquid crystal display apparatus 1000 may be a curved liquid crystal display apparatus. For this reason, the light guide plate 1062 may also have a curved plate-like three-dimensional shape.

The light guide plate 1062 does not need to have a uniform thickness. For example, the light guide plate 1062 may have a wedge-like shape.

The light guide plate 1062 is made from a transparent material, such as acrylic resin, polycarbonate resin, or glass.

The light guide plate 1062 includes a light scattering portion on the non-emission surface 1082 side. The light scattering portion of the light guide plate 1062 disturbs the propagation direction of the light incident on the light guide plate 1062, guides the light incident on the light guide plate 1062 to be in the direction of emission from the emission surface 1080, and reflects the light incident on the light guide plate 1062 toward the inside of the light guide plate 1062. The light scattering portion may be provided by performing dot printing on the non-emission surface 1082, may be provided by roughening the non-emission surface 1082 and using the non-emission surface 1082 as a textured surface, or may be provided by forming a minute spherical surface, unevenness, or the like on the non-emission surface 1082.

1.6 Optical Sheet

The optical sheet 1064 includes a lens sheet and a diffusion sheet, and may include a protective sheet, a viewing angle control sheet, a polarization reflection sheet, and the like. In a case where the optical sheet 1064 includes two or more sheets, the two sheets are placed on top of each other. The optical sheet 1064 may include two or more sheets of the same type. The sheet provided in the optical sheet 1064 is selected according to brightness, an alignment characteristic, and the like required for the liquid crystal display apparatus 1000.

The optical sheet 1064 may include two or more lens sheets. In a case where the optical sheet 1064 includes two or more lens sheets, a combination of directions of prisms included in two or more of the lens sheets is preferably optimized so that the brightness of the liquid crystal display apparatus 1000 is improved. The optical sheet 1064 may include only one diffusion sheet, or may include two or more diffusion sheets. The diffusion sheet may be omitted. In a case Where the optical sheet 1064 includes two or more diffusion sheets, light diffusibility of the optical sheet 1064 can be improved. In a case where the optical sheet 1064 includes two or more diffusion sheets, a lens sheet may be sandwiched between two of the diffusion sheets.

1.7 Reflection Sheet

The reflection sheet 1066 is made of (1) a material containing a matrix made from polyethylene or polyethylene terephthalate, and powder made from barium sulfate or titanium oxide dispersed in the matrix, (2) a material made from resin in which a large number of fine bubbles are formed, (3) a material including a metal plate and a silver film formed by, for example, depositing silver on the metal plate, (4) a material including a metal plate and a titanium oxide-containing film formed by, tier example, applying paint containing titanium oxide, and the like.

The reflection sheet 1066 desirably has a reflectance of 90% or more. In this manner, reflection loss on a reflection surface of the reflection sheet 1066 can be suppressed. The reflection sheet 1066 may be made from a material that specularly reflects light.

1.8 Frame

The rear frame 1068 is preferably made from a metal material, such as aluminum. In this manner, heat dissipation from the point light source 1120 provided in the light source unit 1060 attached to the rear frame 1068 can be efficiently performed, loss of light in the point light source 1120 can be suppressed, and utilization efficiency of light in the backlight 1022 can be improved.

The intermediate frame 1070 is made from resin, metal, or the like.

The front frame 1024 is preferably made from a metal material, such as stainless steel or aluminum. In this manner, the rigidity of the liquid crystal display apparatus 1000 can be improved.

1.9 Positioning of Light Source Unit, Light Guide Plate, and Rear Frame

Figure 5:
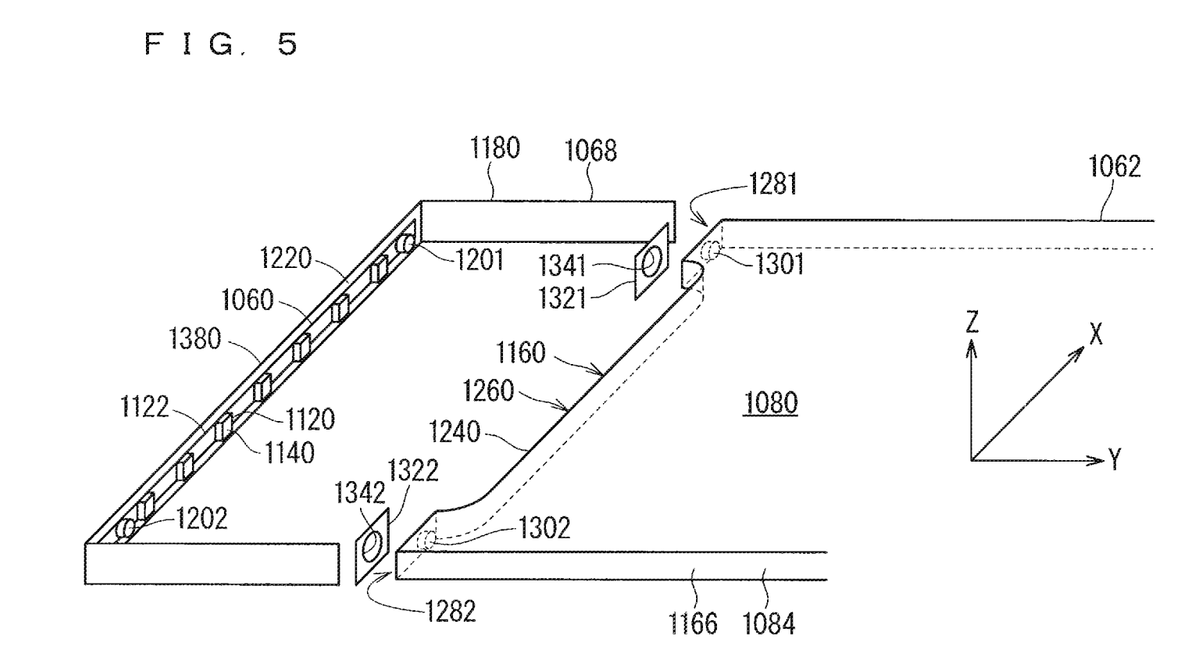
FIG. 5 is an exploded perspective view schematically illustrating a light source unit, a light guide plate, and a rear frame included in the liquid crystal display apparatus according to the first preferred embodiment.
Figure 6:
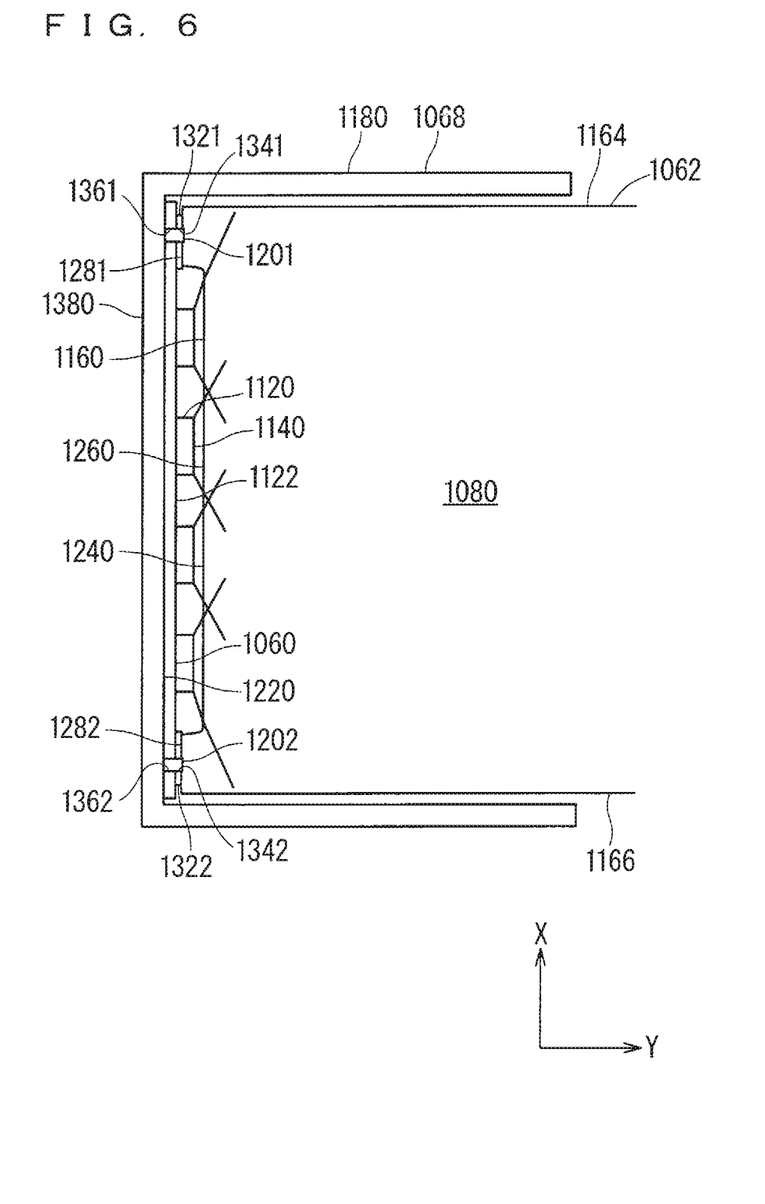
FIG. 6 is a top view schematically illustrating the light source unit, the light guide plate, and the rear frame included in the liquid crystal display apparatus according to the first preferred embodiment.

FIG. 5 is an exploded perspective view schematically illustrating the light source unit, the light guide plate, and the rear frame included in the liquid crystal display apparatus according to the first preferred embodiment. FIG. 6 is a top view schematically illustrating the light source unit, the light guide plate, and the rear frame included in the liquid crystal display apparatus according to the first preferred embodiment.

The rear frame 1068 includes a frame-like body 1180, a protrusion 1201, and a protrusion 1202, as illustrated in FIGS. 5 and 6. The protrusions 1201 and 1202 have a cylindrical shape. The protrusions 1201 and 1202 may have a shape other than the cylindrical shape. The protrusions 1201 and 1202 are disposed at both ends of an inner surface 1220 of the frame-like body 1180 facing the side surface 1160 of the light guide plate 1062, and project from the inner surface 1220 toward the light guide plate 1062.

The light source unit 1060 is disposed on the inner surface 1220 of the frame-like body 1180 and is attached to the inner surface 1220. In this manner, the light-emitting surface 1140 of the point light source 1120 faces the side surface 1160 of the light guide plate 1062, and the light-emitting surface 1140 is parallel to the side surface 1160. In this manner, the light emitted from the point light source 1120 can be efficiently made incident on the light guide plate 1062.

A notch 1240 is formed at the center of the side surface 1160 of the light guide plate 1062, and the light-emitting surface 1140 of the point light source 1120 is made to face the notch 1240. For this reason, the side surface 1160 of the light guide plate 1062 has a light incident surface 1260 at the center, and abutting side surfaces 1281 and 1282 at both ends. The light incident surface 1260 faces the light-emitting surface 1140. The abutting side surfaces 1281 and 1282 project toward the inner surface 1220 of the frame-like body 1180 more than the light incident surface 1260 and abut against the circuit board 1122. The notch 1240 has a rectangular planar shape when viewed in plan from the thickness direction of the light guide plate 1062. The light incident surface 1260, the abutting side surface 1281, and the abutting side surface 1282 have a flat surface. The light-emitting surface 1140 is parallel to the light incident surface 1260. In this manner, the light emitted by the light source unit 1060 can be efficiently taken into the light incident surface 1260. In a case where a plurality of the light-emitting surfaces 1140 respectively provided in a plurality of the point light sources 1120 face the light incident surface 1260 which is a curved surface, a plurality of the light-emitting surfaces 1140 constitute a curved surface so that the light-emitting surface 1140 is parallel to the light incident surface 1260. For example, in a case where a plurality of the light-emitting surfaces 1140 face the light incident surface 1260 that is a concave surface, a plurality of the light-emitting surfaces 1140 constitute a convex surface. Further, in a case where a plurality of the light-emitting surfaces 1140 face the light incident surface 1260 that is a convex surface, a plurality of the light-emitting surfaces 1140 constitute a concave surface. A plurality of the light-emitting surfaces 1140 may constitute a surface having a curved surface and a flat surface surrounding the curved surface.

The notch 1240 has a depth larger than a component height of the point light source 1120. For example, the notch 1240 has a depth that is 0.2 to 0.3 mm larger than a component height of the point light source 1120. In this manner, in a case where the abutting side surfaces 1281 and 1282 of the light guide plate 1062 are made to abut against the circuit board 1122, the light incident surface 1260 of the light guide plate 1062 is separated from the light-emitting surface 1140 of the point light source 1120, and the light incident surface 1260 faces the light-emitting surface 1140 with a gap between them.

The light guide plate 1062 has recesses 1301 and 1302 on the abutting side surfaces 1281 and 1282, respectively. The recesses 1301 and 1302 have shapes conforming to shapes of the protrusions 1201 and 1202, respectively, and are disposed at positions of both ends of the side surface 1160 of the light guide plate 1062 corresponding to positions of both ends of the inner surface 1220 of the frame-like body 1180 where the protrusions 1201 and 1202 are disposed, respectively. Further, the protrusions 1201 and 1202 are inserted into the recesses 1301 and 1302, respectively. In this manner, the protrusions 1201 and 1202 are fitted to the recesses 1301 and 1302, respectively.

The backlight 1022 includes joining media 1321 and 1322. The joining media 1321 and 1322 join the abutting side surfaces 1281 and 1282 of the light guide plate 1062 with the circuit board 1122.

The joining media 1321 and 1322 are rings made from a double-sided adhesive material and having holes 1341 and 1342, respectively. The protrusions 1201 and 1202 are fitted to the recesses 1301 and 1302 of the light guide plate 1062 in a state of passing through the holes 1341 and 1342, respectively. The joining media 1321 and 1322 do not need to be rings.

The light source unit 1060 has holes 1361 and 1362. The protrusions 1201 and 1202 are fitted to the recesses 1301 and 1302 of the light guide plate 1062 in a state of passing through the holes 1361 and 1362, respectively.

According to the structure described above, the protrusions 1201 and 1202 of the rear frame 1068 are fitted to the recesses 1301 and 1302 of the light guide plate 1062, respectively. For this reason, the light guide plate 1062 is inhibited from moving in an X-axis direction and a Z-axis direction parallel to the inner surface 1220 of the rear frame 1068. Further, the abutting side surfaces 1281 and 1282 of the light guide plate 1062 are fixed to the light source unit 1060 disposed on the inner surface 1220 of the rear frame 1068 by the joining media 1321 and 1322, respectively. For this reason, the light guide plate 1062 is inhibited from moving in a Y-axis direction perpendicular to the inner surface 1220 of the rear frame 1068. By the above, the relative position of the light source unit 1060 with respect to the light guide plate 1062 is maintained at a fixed position.

Further, according to the structure described above, the protrusions 1201 and 1202 are inserted into the holes 1361 and 1362 of the light source unit 1060, respectively. For this reason, the light source unit 1060 is inhibited from moving in the X-axis direction and the Z-axis direction parallel to the inner surface 1220 of the rear frame 1068. In this manner, the relative position of the light source unit 1060 with respect to the light guide plate 1062 is effectively maintained at a fixed position.

Further, according to the structure described above, the abutting side surfaces 1281 and 1282 of the light guide plate 1062 having the recesses 1301 and 1302 of the light guide plate 1062 to which the protrusions 1201 and 1202 of the rear frame 1068 are fitted project toward the inner surface 1220 of the rear frame 1068 on which the light source unit 1060 is disposed more than the light incident surface 1260 of the light guide plate 1062 facing the light-emitting surface 1140 of the point light source 1120. For this reason, light traveling from the light-emitting surface 1140 toward the recesses 1301 and 1302 and the protrusions 1201 and 1202 is reduced, and scattering of the light emitted by the light source unit 1060 at the recesses 1301 and 1302 and the protrusions 1201 and 1202 is suppressed. For example, an elevation angle from a vertical axis perpendicular to the light-emitting surface 1140 in a direction from the light-emitting surface 1140 toward the recesses 1301 and 1302 and the protrusions 1201 and 1202 is 90° or more. For this reason, as illustrated in FIG. 6, at least the light that is emitted by the point light source 1120, is incident on the light guide plate 1062, and is diffracted or straightly travels does not hit the recesses 1301 and 1302 and the protrusions 1201 and 1202, and scattering of the light at the recesses 1301 and 1302 and the protrusions 1201 and 1202 is suppressed.

By the above, the uniformity of the in-plane brightness of the backlight 1022 can be improved and variations in the brightness of the backlight 1022 among individual backlights can be suppressed.

Further, by the above, a shift of the relative position of the light source unit 1060 with respect to the light guide plate 1062 from a position where the light emitted by the light source unit 1060 can be efficiently made incident on the light incident surface 1260 of the light guide plate 1062 can be suppressed. Accordingly, the liquid crystal display apparatus 1000 that has high efficiency, high brightness, and low power consumption can be realized. Further, the liquid crystal display apparatus 1000 can be realized by employing a top-view LED.

For example, in a case where a distance from the point light source 1120 to the light incident surface 1260 of the light guide plate 1062 is 0.2 mm, the abutting side surfaces 1281 and 1282 of the light guide plate 1062 project from the light incident surface 1260 by 0.8 mm, the thickness of the light guide plate 1062 is 1.7 mm, and the X-axis direction dimension and the Z-axis direction dimension of the light-emitting surface 1140 of the point light source 1120 are 3.5 mm and 1.0 mm, respectively, about 85% of the light emitted by the light source unit 1060 can be made incident on the light guide plate 1062.

1.10 Example of Height of Protrusion

The protrusions 1201 and 1202 preferably have a height that is 0.5 times or more and 1.0 times or less the thickness of a side wall 1380 having the inner surface 1220 of the frame-like body 1180. In a case where the height of the protrusions 1201 and 1202 is smaller than 0.5 times the thickness of the side wall 1380, the protrusions 1201 and 1202 tend to be insufficiently fitted to the recesses 1301 and 1302 of the light guide plate 1062. Further, in a case where the height of the protrusions 1201 and 1202 is larger than 1 time the thickness of the side wall 1380, the protrusions 1201 and 1202 that exhibit a high positioning effect tend to be difficult to be formed by sheet metal working. For example, the protrusions 1201 and 1202 that exhibit a high positioning effect and have a perfect circular and rectangular cross-sectional shapes tend to be difficult to be formed.

When the side wall 1380 has a thickness of 0.8 mm and the circuit board 1122 has a thickness of 0.2 to 0.3 mm, the protrusions 1201 and 1202 must have a height of at least 0.4 mm so that the protrusions 1201 and 1202 respectively pass through the holes 1361 and 1362 of the circuit board 1122 to be fitted to the recesses 1301 and 1302 of the light guide plate 1062. Further, in a case where the height of the protrusions 1201 and 1202 is larger than 0.8 mm, the protrusions 1201 and 1202 that exhibit a high positioning effect and have a perfect circular and rectangular cross-sectional shapes tend to be difficult to be formed.

1.11 Numbers and Positions of Protrusions, Abutting Side Surfaces and Recesses

The rear frame 1068 has two protrusions including protrusions 1201 and 1202. Further, the side surface 1160 of the light guide plate 1062 has two abutting side surfaces including the abutting side surfaces 1281 and 1282. Further, the light guide plate 1062 has two recesses including the recesses 1301 and 1302.

The rear frame 1068 may include three or more protrusions. Further, the side surface 1160 of the light guide plate 1062 may have three or more abutting side surfaces. Further, the light guide plate 1062 may have three or more recesses. Three or more of the protrusions project from the inner surface 1220 of the frame-like body 1180, respectively. Three or more of the recesses are on three or more of the abutting side surfaces. Three or more of the protrusions are fitted to three or more of the recesses, respectively.

The rear frame 1068 has two or more protrusions, the side surface 1160 of the light guide plate 1062 has two or more abutting side surfaces, the light guide plate 1062 has two or more recesses, and two or more of the protrusions are respectively fitted to two or more of the recesses, so that rotation of the rear frame 1068 and the light source unit 1060 relative to the light guide plate 1062 is suppressed, and tilting of the rear frame 1068 and the light source unit 1060 relative to the light guide plate 1062 is suppressed. In this manner, the relative position of the light source unit 1060 with respect to the light guide plate 1062 is effectively maintained at a fixed position.

The protrusions 1201 and 1202 are disposed at both ends of the inner surface 1220 of the frame-like body 1180. Further, the abutting side surfaces 1281 and 1282 of the light guide plate 1062 are disposed at both ends of the side surface 1160 of the light guide plate 1062. Further, the recesses 1301 and 1302 of the light guide plate 1062 are disposed at both ends of the side surface 1160 of the light guide plate 1062.

However, both or one of the protrusions 1201 and 1202 may be disposed in a portion other than both ends of the inner surface 1220 of the frame-like body 1180. Further, both or one of the abutting side surfaces 1281 and 1282 of the light guide plate 1062 may be disposed in a portion other than both ends of the side surface 1160 of the light guide plate 1062. Further, the recesses 1301 and 1302 of the light guide plate 1062 may be disposed in a portion other than both ends of the side surface 1160 of the light guide plate 1062. For example, both or one of the protrusions 1201 and 1202 may be disposed at the center of the inner surface 1220. Further, both or one of the abutting side surfaces 1281 and 1282 may be disposed at the center of the side surface 1160. Further, both or one of the recesses 1301 and 1302 may be disposed at the center of the side surface 1160.

2 Second Preferred Embodiment

FIG. 1 is also an exploded perspective view schematically illustrating the liquid crystal display apparatus according to a second preferred embodiment. FIG. 2 is also an exploded perspective view schematically illustrating the backlight included in the liquid crystal display apparatus according to the second preferred embodiment. FIG. 3 is a perspective view schematically illustrating the point light source included in the liquid crystal display apparatus according to the second preferred embodiment. FIG. 4 is a diagram illustrating light emission intensity distribution in a vertical plane of the point light source provided in the liquid crystal display apparatus of the second preferred embodiment.

Figure 7:
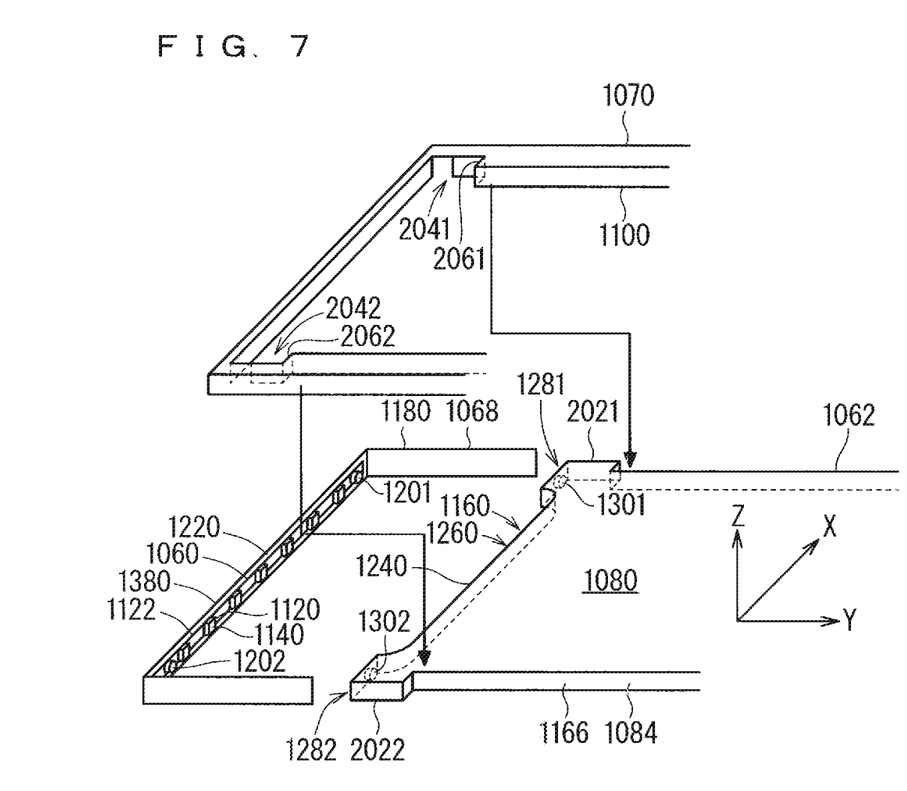
FIG. 7 is an exploded perspective view schematically illustrating a light source unit, a light guide plate, and a rear frame included in the liquid crystal display apparatus according to the second preferred embodiment.
Figure 8:
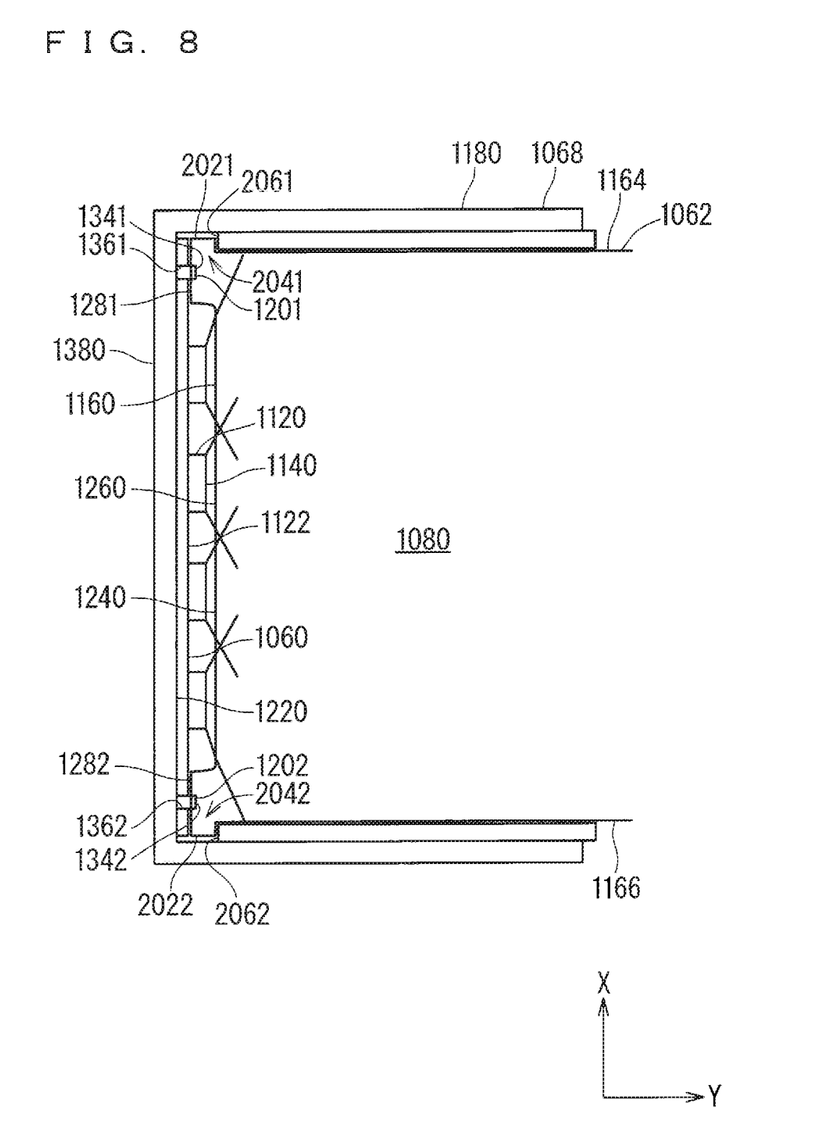
FIG. 8 is a top view schematically illustrating the light source unit, the light guide plate, and the rear frame included in the liquid crystal display apparatus according to the second preferred embodiment.

FIG. 7 is an exploded perspective view schematically illustrating the light source unit, the light guide plate, and the rear frame included in the liquid crystal display apparatus according to the second preferred embodiment. FIG. 8 is a top view schematically illustrating the light source unit, the light guide plate, and the rear frame included in the liquid crystal display apparatus according to the second preferred embodiment.

A liquid crystal display apparatus 2000 of the second preferred embodiment is different from the liquid crystal display apparatus 1000 of the first preferred embodiment mainly in differences described below.

In the liquid crystal display apparatus 1000 of the first preferred embodiment, as illustrated in FIGS. 3 and 4, the joining media 1321 and 1322 respectively join the abutting side surfaces 1281 and 1282 of the light guide plate 1062 with the circuit board 1122. In this manner, the light guide plate 1062 is inhibited from moving in the Y-axis direction perpendicular to the inner surface 1220 of the rear frame 1068.

On the other hand, in the liquid crystal display apparatus 2000 of the second preferred embodiment, the light guide plate 1062 includes projecting portions 2021 and 2022, as illustrated in FIGS. 7 and 8. The projecting portions 2021 and 2022 project in the X-axis direction different from the Y-axis direction in which the abutting side surfaces 1281 and 1282 of the light guide plate 1062 project. The projecting portions 2021 and 2022 are disposed on the side surfaces 1164 and 1166 of the light guide plate 1062, respectively, and are disposed closer to the side surface 1160 of the light guide plate 1062. Further, the intermediate frame 1070 includes sandwiching portions 2041 and 2042. The sandwiching portions 2041 and 2042 respectively have notches 2061 and 2062 on the lower surface of the intermediate frame 1070. The projecting portions 2021 and 2022 are fitted to the notches 2061 and 2062, respectively. In this manner, the sandwiching portions 2041 and 2042 respectively sandwich the projecting portions 2021 and 2022 from the Y-axis direction perpendicular to the inner surface 1220 of the frame-like body 1180. In this manner, the light guide plate 1062 is inhibited from moving in the Y-axis direction perpendicular to the inner surface 1220.

Regarding points other than the above differences, the configuration employed in the liquid crystal display apparatus 1000 of the first preferred embodiment is also employed in the liquid crystal display apparatus 2000 of the second preferred embodiment.

According to the structure described above, an effect similar to that described in the first preferred embodiment is produced. For example, in a case where an X-direction dimension and a Y-direction dimension of each of the projecting portions 2021 and 2022 are 3 mm and 10 mm, respectively, brightness similar to that described in the first preferred embodiment can be obtained.

Further, according to the structure described above, an effect similar to that described in the first preferred embodiment can be obtained by changing the shape of the intermediate frame 1070 without adding new members, such as the joining media 1321 and 1322. For this reason, the cost of the liquid crystal display apparatus 1000 does not increase.

Note that, in the present invention, within the scope of the invention, preferred embodiments can be freely combined with each other, and each preferred embodiment can be appropriately modified or omitted.

While the invention has been shown and described in detail, the foregoing description is in all aspects illustrative and not restrictive. It is therefore understood that numerous modifications and variations can be devised without departing from the scope of the invention.

What is claimed is:
1. A backlight, comprising:
 a rear frame including a frame-like body having an inner surface, and a protrusion projecting from the inner surface;
 a light source unit that is housed in the rear frame, is disposed on the inner surface, and includes a point light source having a light-emitting surface;
 a light guide plate that is housed in the rear frame, has a side surface having a light incident surface facing the light-emitting surface with a gap between the light incident surface and the light-emitting surface, and an abutting side surface that projects toward the inner surface more than the light incident surface, and has a recess to which the protrusion is fitted on the abutting side surface; and
 an adhesive joining medium that holds together the abutting side surface with the light source unit.
2. The backlight according to claim 1, wherein
 the rear frame includes a side wall having the inner surface, and
 the protrusion has a height 0.5 times or more and 1.0 times or less a thickness of the side wall.
3. The backlight according to claim 1, wherein
 the light source unit has a hole, and
 the protrusion penetrates the hole.
4. The backlight according to claim 1, wherein
 the light-emitting surface is parallel to the light incident surface.
5. The backlight according to claim 1, wherein
 the rear frame includes a plurality of protrusions projecting from the inner surface,
 the side surface has a plurality of abutting side surfaces, the light guide plate respectively has a plurality of recesses on the plurality of abutting side surfaces, and the plurality of protrusions are respectively fitted to the plurality of recesses.

6. A display apparatus, comprising:

the backlight according to claim 1; and a display panel illuminated by the backlight.

7. A backlight, comprising:

a rear frame including a frame-like body having an inner surface, and a protrusion projecting from the inner surface;

a light source unit that is housed in the rear frame, is disposed on the inner surface, and includes a point light source having a light-emitting surface;

a light guide plate that is housed in the rear frame, has a main surface that is opposite to the rear frame and configured to emit light, has a side surface having a light incident surface facing the light-emitting surface with a gap between the light incident surface and the light-emitting surface, and an abutting side surface that projects toward the inner surface more than the light incident surface, has a recess to which the protrusion is fitted on the abutting side surface, and a projecting portion projecting in a direction different from a direction in which the abutting side surface projects; and an intermediate frame that sandwiches the light guide plate together with the rear frame in a direction perpendicular to the main surface of the light guide plate, and includes a sandwiching portion that sandwiches the projecting portion from a direction perpendicular to the inner surface and parallel to the main surface of the light guide plate.

8. The backlight according to claim 7, wherein the rear frame includes a side wall having the inner surface, and the protrusion has a height 0.5 times or more and 1.0 times or less a thickness of the side wall.

9. The backlight according to claim 7, wherein the light source unit has a hole, and the protrusion penetrates the hole.

10. The backlight according to claim 7, wherein the light-emitting surface is parallel to the light incident surface.

11. The backlight according to claim 7, wherein the rear frame includes a plurality of protrusions projecting from the inner surface, the side surface has a plurality of abutting side surfaces, the light guide plate respectively has a plurality of recesses on the plurality of abutting side surfaces, and the plurality of protrusions are respectively fitted to the plurality of recesses.

12. A display apparatus, comprising:

the backlight according to claim 7; and a display panel illuminated by the backlight.

13. The backlight according to claim 1, wherein the protrusion is disposed at the inner surface.

14. The backlight according to claim 7, wherein the protrusion is disposed at the inner surface.

* * * * *